UNITED STATES PATENT OFFICE.

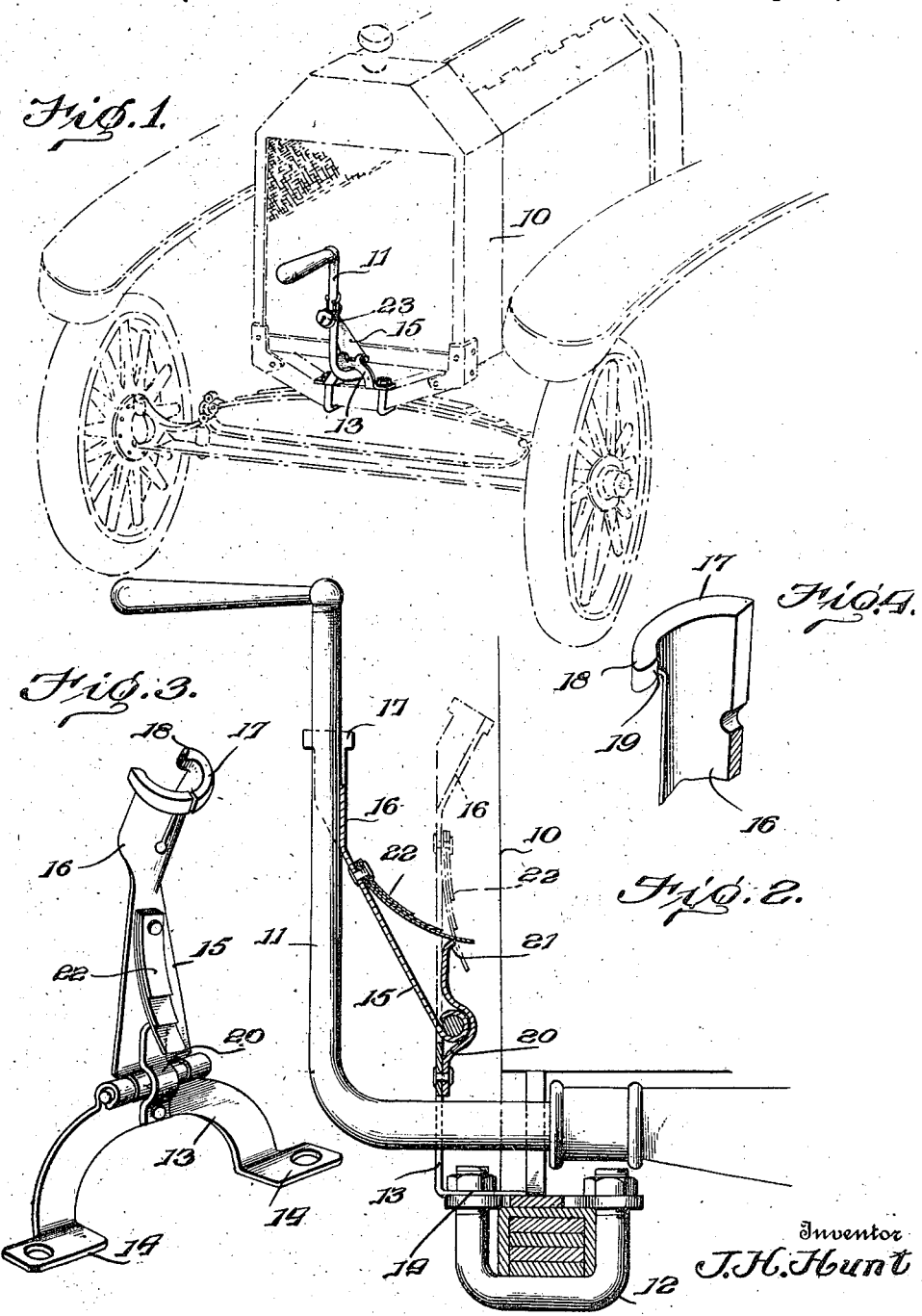

JOHN H. HUNT, OF FLAT RIVER, MISSOURI.

CRANK-HOLDING ATTACHMENT FOR MOTOR-VEHICLES.

1,222,104.  Specification of Letters Patent.  Patented Apr. 10, 1917.

Application filed October 13, 1915. Serial No. 55,663.

*To all whom it may concern:*

Be it known that I, JOHN H. HUNT, a citizen of the United States, residing at Flat River, in the county of St. Francois and State of Missouri, have invented certain new and useful Improvements in Crank-Holding Attachments for Motor-Vehicles, of which the following is a specification.

This invention contemplates an improved crank holding attachment for motor vehicles and has as its primary object to provide a device of this character which may be readily applied to any conventional type of motor vehicle and which will be adapted to hold the engine crank thereof upwardly so that the motion of the motor vehicle will not swing the crank and so that mud, water, or other foreign matter will not become splashed against the crank to make the handling thereof disagreeable.

The invention has as a further object to provide an improved device of this character adapted to project upwardly in front of the radiator of the motor vehicle and movable to engage the crank thereof when the crank is swung upwardly and further, in this connection, to provide a device of this character adapted to yieldably grip the crank.

The invention has as a further object to provide a device of this character which will be yieldably urged to normal position out of the path of movement of the crank, so that when released from the crank, the device will form no obstruction to the proper manipulation thereof in cranking the motor vehicle.

A still further object of the invention is to provide an improved device of this character which will be neat and which when applied to a motor vehicle will not detract from the appearance thereof.

And the invention has as a still further object to provide an improved crank holding attachment which may be employed for locking the crank in inactive position so that unauthorized persons cannot use the motor vehicle and to at the same time, provide a device of this character which, under normal circumstances, may be readily attached to the crank and may as easily be disengaged therefrom.

Other and incidental objects will appear as the description proceeds and in the drawings wherein I have illustrated the preferred embodiment of the invention and wherein similar reference characters designate corresponding parts throughout the several views, Figure 1 is a perspective view showing my improved attachment in connection with a conventional type of motor vehicle and illustrating the manner in which a lock may be employed in connection with the attachment for locking the crank in inactive position.

Fig. 2 is a vertical sectional view more particularly illustrating the mounting of the attachment upon the motor vehicle and the manner in which the said attachment is adapted to engage the crank of the motor vehicle for holding it upwardly.

Fig. 3 is a detail perspective view of the attachment more particularly illustrating the construction of the base thereof as well as the construction of the gripping member carried by the attachment for engaging the crank of the motor vehicle, and Fig. 4 is a fragmentary perspective view on a slightly enlarged scale illustrating the lugs formed on the free ends of the reinforcing rib for the said gripping member, the lugs being adapted to coact with the rib in engaging the crank of the motor vehicle.

For convenience, I have shown my improved attachment in connection with a conventional type of automobile having a radiator 10, a crank 11, and being provided with clips 12 connecting the forward part of the vehicle chassis with the front springs of the vehicle.

Coming now more particularly to the subject of the present invention, I employ an arch shaped base 13, preferably formed from a strip of suitable sheet metal and which is provided, at its ends, with laterally projecting ears 14 having openings formed therein which receive adjacent sides of the clips 12, in the manner best shown in Fig. 1 of the drawings with the base straddling the crank 11 as therein illustrated.

Swingingly connected to the base 13 is an upstanding arm 15. The arm 15 is preferably formed from a suitable piece of resilient sheet metal and at its inner end, is cut away to provide a suitable hinge lug adapted to mate with coacting hinge lugs formed upon the upper side of the base 13. Connecting the said hinge lugs is a suitable pivot pin. The arm 15 is preferably tapered toward its free end as more particularly shown in Fig. 3 and, at its outer extremity, is transversely curved or bent, to provide a channel shaped gripping member 16 which extends obliquely from the said arm toward the rear side thereof, the arm being transversely bent at the juncture of the gripping member therewith.

The gripping member 16 is longitudinally slotted or split to provide coacting yieldable gripping fingers and at the outer end thereof is formed with a substantially semi-circular reinforcing rib 17 which projects slightly beyond the sides of the gripping member with the adjacent terminals thereof providing guide lugs 18. The confronting faces of these lugs are, as more particularly shown in Fig. 3, reversely beveled at the outer ends thereof and the said lugs are slightly enlarged in the rear of said beveled faces to form shoulders 19 adapted to coact with the yieldable fingers of the gripping member in engaging the crank of the vehicle as shall presently be more fully described.

Connected to the base 13, is a stop 20 which is longitudinally bowed to fit over the hinged connection between the arm 15 and the base and is arranged to extend longitudinally of the arm to engage therewith for limiting the arm in its swinging movement toward the radiator 10 with the arm disposed in substantially vertical position, as more particularly shown in Fig. 2. At its free end, the stop 20 is bent laterally and rearwardly to provide an upstanding rib 21 and arranged to ride over the said rib to engage therewith, is a leaf spring 22, the inner end of which is fixed to the arm 15 adjacent the outer extremity thereof.

It will now be observed that the arm 15 is arranged immediately in the rear of the crank 11 when the crank is swung upwardly as shown in Figs. 1 and 2, and to engage the device with the crank, the outer end of the arm 15 is moved outwardly against the tension of the spring 22 and the guide lugs 18 of the gripping member engaged upon opposite sides of the crank. The outer faces of these guide lugs will serve to readily direct the crank between the said lugs and slight pressure upon the gripping member will then act to spread the yieldable fingers of the gripping member so that the said gripping member will engage around the crank in the manner shown in full lines in Fig. 2.

In this connection, it is pointed out that the yieldable gripping action of the member 16 upon the crank will be sufficient to overcome the tendency of the spring 22 to return the free end of the arm to normal position so that until the crank is manually disengaged from the gripping member, the device will operate to hold the crank in an upward position. The yieldable fingers of the member 16 will act to grip the crank upon opposite sides thereof while the shoulders 19 of the guide lugs 18 will engage the front side of the crank to coöperate with the said gripping fingers so that, under normal circumstances, the crank cannot jar loose from engagement with the gripping member under vibration of the motor or the jolting caused by rough roads, but will be securely held in an upward position where mud, water, or other foreign objects can not splash against the crank to render the manipulation thereof disagreeable. Furthermore, any swinging of the crank while the vehicle is in motion which, it may be stated, very often causes annoyance, will be entirely eliminated.

To disengage the device from the crank, a slight inward push or blow is given the free end of the crank. Such inward motion of the crank will cause a corresponding inward pivotal movement of the arm 15. As the free end of the arm 15 moves inwardly, the gripping member 16 will fulcrum at its inner end upon the crank so that its outer end will be moved inwardly toward the radiator of the vehicle and the gripping fingers of the said member consequently forced out of engagement with the crank, the outer ends of the said fingers spreading to allow the crank to pass between the shoulders 19 of the reinforcing rib 17.

It will thus be seen that my improved device may be easily engaged with the crank and may be disengaged therefrom with equal facility. When the crank has been operated to disengage the gripping member 16 therefrom, and the arm 15 is free, the spring 22 will act to return the arm to normal vertical position in engagement with the stop 20, so that the said arm will be entirely out of the way when it is desired to manipulate the crank for cranking the engine of the vehicle. In this connection, attention is directed to the fact that the base 13 is so formed that the longitudinal shifting movement of the inner end of the crank will be unhampered as will also the turning movement of the crank. Furthermore, attention is directed to the fact that the stop 20 is so arranged that when the arm 15 is disengaged from the crank and is urged inwardly by the spring 22, the said stop will engage the arm to prevent the free end thereof from striking the radiator, so that by no possibility can the device cause injury to the vehicle.

As will at once be clear from the preceding description, my improved device may be readily applied to any conventional type of motor vehicle without the necessity of structural change therein. Furthermore, when so applied, the presence of the device will be unobtrusive and the attachment will not in the least detract from the appearance of the vehicle.

In Fig. 1 of the drawings, I have illustrated the manner in which a conventional type of lock, indicated at 23, may be employed in connection with my improved device for locking the crank 11 in inactive position. The hasp of the lock is engaged around the crank 11 and around the arm 15 at its outer extremity, so that the gripping member 16 cannot then be disengaged from the crank. Consequently, the presence of the lock will prevent any unauthorized person from using the machine.

Having thus described my invention, what I claim and desire to secure by Letters Patent is:

1. A device of the character described including a base, an arm shiftable upon the base, and a gripping member carried by the arm and extending obliquely thereto, the base being adapted for operative attachment to a motor with the arm extending radially of the axis of the motor crank and adapted for movement to engage the said gripping member with the crank for holding the crank against turning movement with the said gripping member seating flatly against the crank and extending longitudinally thereof.

2. A device of the character described including a base, an arm shiftable upon the base, and an open gripping member carried by said arm and provided with a reinforcing member forming coacting guide lugs, the base being adapted for operative attachment to a motor with the arm extending radially of the axis of the motor crank and adapted for movement to engage the said lugs upon opposite sides of the crank for directing the gripping member into engagement with the crank to hold the crank against turning movement.

3. A device of the character described including a base, an arm shiftable upon the base, and a channel-shaped gripping member carried by the arm and provided with a reinforcing rib forming coacting guide lugs upon the open side of the gripping member, the gripping member being longitudinally slit to form coacting gripping fingers, the base being adapted for operative attachment to a motor with the arm extending radially of the axis of the motor crank and adapted for movement to engage the said guide lugs upon opposite sides of the crank for directing the said gripping member into engagement with the crank to hold the crank against turning movement with the said gripping fingers confronting the crank upon opposite sides thereof.

4. A device of the character described including a base, an arm carried thereby, a gripping member carried by the said arm, and means normally urging the arm to inactive position upon the base, the base being adapted for operative attachment to a motor with the gripping member yieldably engaging the motor crank and with the said means acting against the tension of the gripping member upon the crank to move the arm to a position to disengage the said gripping member and free the crank.

5. The combination with a motor having a crank, of a crank holder therefor including an arm, a gripping member carried thereby and adapted to yieldably engage the crank for holding the crank against turning movement, and means associated with the said arm and acting thereon against the tension of said gripping member to disengage the said gripping member and free the crank.

6. An engine crank holding device including a base, a crank engaging arm swingingly connected to the base and movable to active position to engage with the crank, a stop associated with the arm, and means mounted to ride over the stop and normally urging the arm rearwardly to inactive position in engagement with the said stop.

7. A device of the character described including a base, a crank engaging arm pivotally connected thereto and movable from vertical inactive position upon the base to incline forwardly therefrom in active position, a stop projecting into the path of movement of the arm to inactive position, and yieldable means carried by the said arm and slidably engaging the stop for normally urging the arm toward the stop.

8. The combination with a motor vehicle, of a crank holder therefor including a pivotally mounted arm normally arranged in vertical inactive position disposed substantially parallel to the front of the radiator of the vehicle and shiftable away from the radiator to incline forwardly in active position engaging with the motor crank, and a stop arranged to engage the arm for positively limiting the arm in its movement to inactive position toward the front of the radiator, with the said arm spaced from the radiator.

In testimony whereof, I affix my signature.

JOHN H. HUNT. [L. S.]